Sept. 20, 1966 J. W. BRIMSEK 3,274,548
ILLUMINATING AND SIGNAL DEVICE
Filed April 3, 1963 2 Sheets-Sheet 2
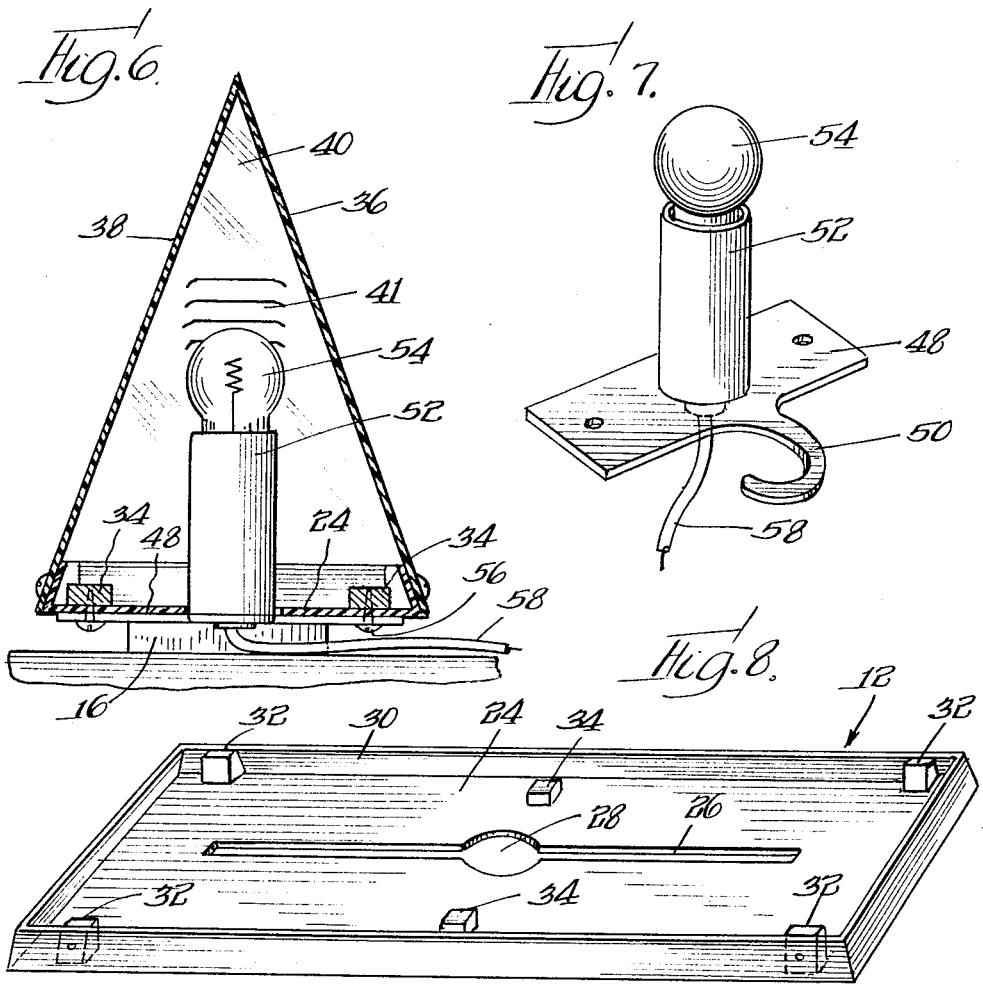
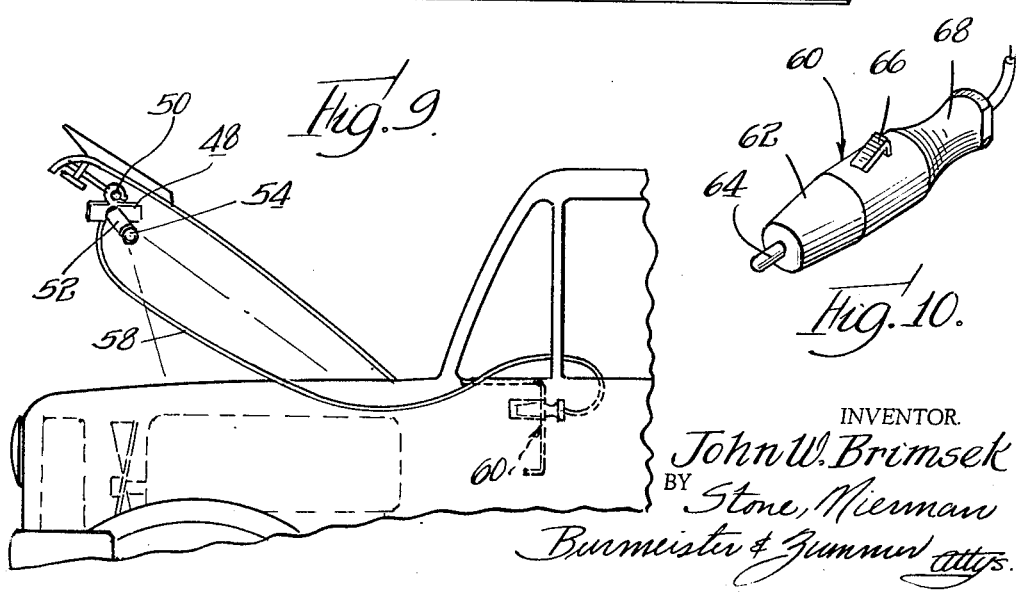
INVENTOR.
John W. Brimsek
BY Stone, Nieman
Burmeister & Zummer attys.

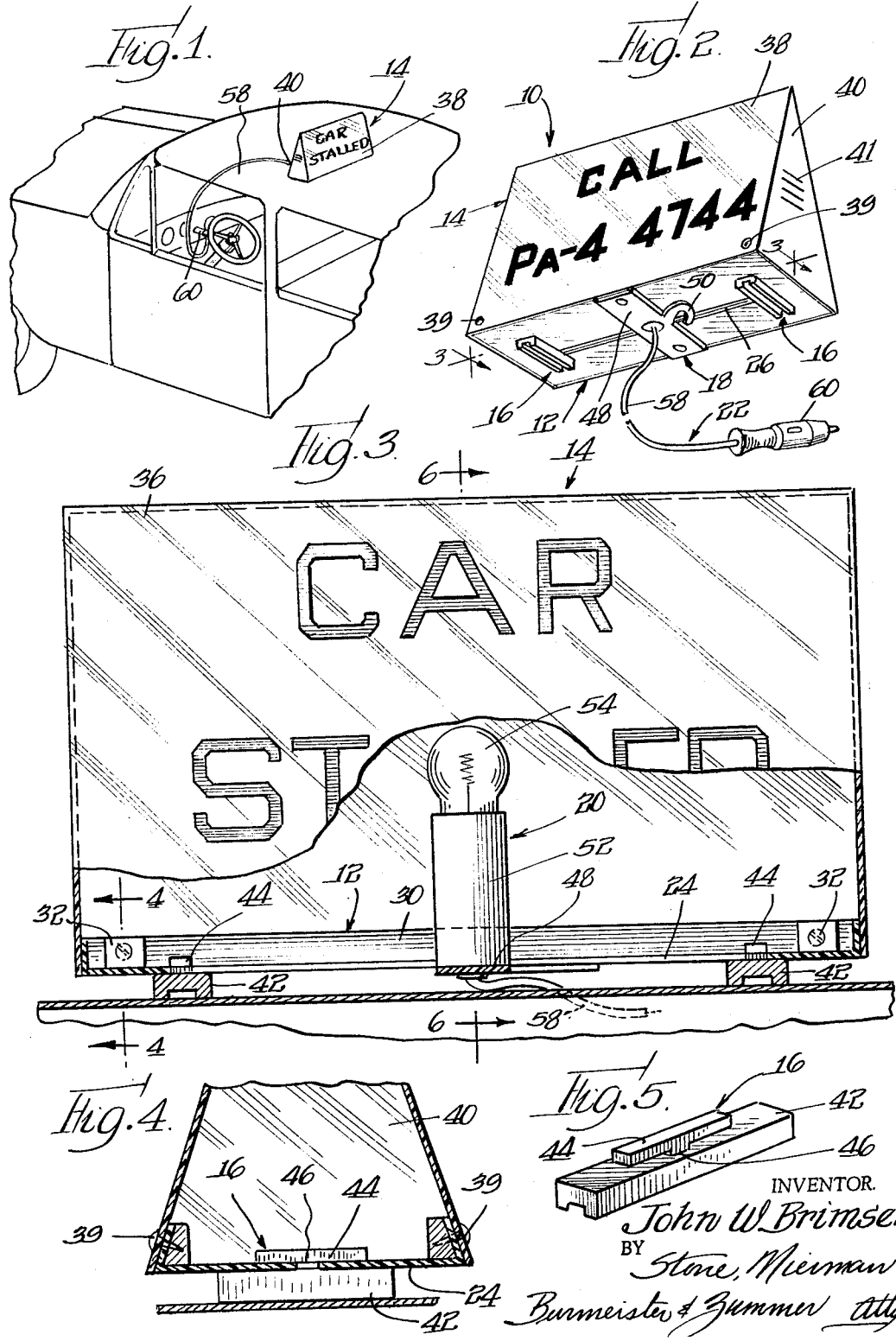

United States Patent Office 3,274,548
Patented Sept. 20, 1966

3,274,548
ILLUMINATING AND SIGNAL DEVICE
John W. Brimsek, 630 Long Road, Glenview, Ill.
Filed Apr. 3, 1963, Ser. No. 270,304
3 Claims. (Cl. 340—84)

This invention relates to an improved construction for an illuminating and signal device and more particularly to a device suitable for use with an automobile to provide a source of illumination in an automobile in the event of disability of the automobile and a means for providing a signal to indicate that an automobile is disabled.

With the advent of toll road and expressway automobile transportation, the normal operating speeds of automobiles has substantially increased. Although present-day automobiles have a high degree of reliability and automobile service stations abound in great profusion, automobile services are quite limited on limited access highways and in the open country. On limited access highways such as expressways and tollways, when a car is disabled, the driver of such an automobile has difficulty in making known his plight and indicating what assistance he may desire. Inasmuch as the speeds on many of these highways are great, most motorists observing a disabled automobile, do not have an opportunity to lend immediate assistance. It is, therefore, desirable to provide a device for signalling that the automobile is disabled, and also signalling how assistance may be rendered to the driver of the disabled automobile. It is, therefore, a principal object of the herein-disclosed invention to provide a signalling device for use on an automobile to indicate disability of the automobile and, also to provide a means for signalling the assistance desired by the driver.

It is a further object of the herein-disclosed invention to provide an illuminated signal device which may be readily mounted on an automobile, even by a lady driver.

It is another object of the present invention to provide a signalling device which is simple to manipulate and may be easily attached to an automobile.

It is a still further object of this invention to provide a signalling device which may also provide a source of illumination.

It is still another object of the present invention to provide a signal device which may also provide a trouble light for use under the hood of an automobile.

Other objects and uses of the present invention will become readily apparent to those skilled in the art upon a perusal of the following specification in light of the accompanying drawings in which:

FIGURE 1 is a perspective view of a portion of an automobile with a device mounted on top of the automobile which device embodies the herein-disclosed invention;

FIGURE 2 is a perspective view of the device shown in FIGURE 1 showing the bottom of the device;

FIGURE 3 is a partial cross-sectional view taken on line 3—3 of FIGURE 2 showing a portion of the interior of the instant device;

FIGURE 4 is a cross-sectional view of a portion of the device shown in FIGURE 2 taken on line 4—4 of FIGURE 3;

FIGURE 5 is a perspective view of a magnet shown in FIGURE 2 which constitutes a portion of the present device;

FIGURE 6 is a cross-sectional view taken on line 6—6 of FIGURE 3;

FIGURE 7 is a perspective view of a light source which constitutes a portion of the device shown in FIGURE 1 which portion may also be used as a trouble light;

FIGURE 8 is a perspective view of the base of the device shown in FIGURE 1;

FIGURE 9 is a side elevation of a portion of an automobile showing how the light source shown in FIGURE 7 may be used as a trouble light; and FIGURE 10 is a perspective view of an electric plug which is a portion of the device shown in FIGURE 2.

Referring now to the drawings and especially to FIGURE 2 and 3, a signal device generally indicated by numeral 10 is shown therein. The device 10 generally consists of a base 12, a sign portion 14, a pair of identical magnets 16 mounted on the base 12, and a trouble light 18 which includes a light source 20 and a cord 22.

Referring now to FIGURE 8, it may be seen that the base 12 includes a flat bottom 24 which has an elongated slot 26 contained therein with an enlarged circular aperture 28 in the center of the slot. An outer peripheral wall 30 is fixed to the floor 24 with four blocks 32 fixed to the floor and the peripheral wall 30. The floor 24 also has two mounting blocks 34 fixed thereon to provide additional support for the trouble light 18.

The sign portion 14 includes a flat translucent message plate 36 which, in this instance, has the message "CAR STALLED" inscribed thereon. The plate 36, in this instance, is red in color to provide a warning. A second flat translucent message plate 38 has one edge fixed to one edge of the plate 36. The opposite edge of plate 38 is fixed to the base 12 by a pair of screws 39 which are mounted in a pair of the blocks 32. The plate 36 is secured to the base 12 in the same manner. A pair of identical triangular end walls 40 is fixed to the message plates and the base to provide a closed rigid structure. Each of the end walls has a plurality of vents 41 contained therein to allow heat generated by the light source to be dissipated through said vents.

It may be noted that the plate 38 is translucent in this instance though it may be either translucent or transparent, and the surface is such that it accepts writing from a grease pencil, lipstick, or a child's crayon for the inscription of a message.

The magnets 16 provide a means for removably securing the base to an automobile. Each of the magnets is identical in construction in that it includes a magnetic bar 42 with a T-shaped arm 44 fixed to the bar. It may be noted that a lower portion 46 of arm 44 provides a neck between the upper portion of the arm and the bar 42. As may be clearly seen in FIGURE 3, the base is positioned between the upper portion of the arm and the bar. Each of the magnets is attached to the base by inserting the arm 44 through the slot 26 and then it is rotated 90° to lock the magnet to the base. The magnets are further secured to the base by means of glue, though any other suitable means may be used.

The trouble light 18 includes a light mount 48 which is a substantially flat bar. The light mount has a hook 50 formed integral therewith. Fixed to the light mount is a conventional electric light socket 52 which has a conventional electric lamp 54 mounted therein. The light mount is fixed to the base by a pair of screws 56 which extend through the light mount and are threadedly mounted in the blocks 34. It may be seen that the socket 52 is positioned in the aperture 28 so that the electric light 54 is positioned between the two translucent plates 36 and 38.

The electric light is connected to the source of electrical energy through the cord assembly 22. The cord assembly 22 includes an electric cord 58 which has one end connected to the socket 52. Mounted on the other end of the electric cord is a plug 60. The plug 60 includes a body 62, having a contact 64 in the central portion thereof and a locking contact 66 on the outer periphery. It may be appreciated that the body 62 is an insulating body which also provides a handle portion 68 for easy handling of the plug 60.

It may be readily appreciated that the device 10 may be readily and conveniently used. Should an automobile become disabled, it is not even necessary for the driver to step out of the car. The driver opens a window in the automobile and sets the sign on top of the roof of the automobile. The magnets 16 readily attach the sign to the roof. The next step which the driver performs is the insertion of plug 60 into the receptacle of his cigar lighter in the dashboard of the automobile. Thus, the light 54 is energized and the sign is illuminated.

It may be noted that the message plate 36 contains a permanent message. In this case, "CAR STALLED." This permanent message acts a warning device for approaching automobiles. The other message plate 38 provides a surface for writing a message. In this instance, the message is to call a given telephone number. Thus, the driver wishing to lend assistance, but not having the opportunity, may readily call a number after leaving a limited access highway or upon reaching a telephone.

It should also be noted that since the message plates are sloping, a number of advantages are provided. First of all, the cost of the construction is reduced in view of the fact that less materials are used. Since less materials are used, the sign is lighter, so that it may be readily handled by even a woman. Furthermore, there is a reduction in wind resistance.

When it is desired to remove the sign, it is a simple matter to do so. The sign need only be lifted, and the sign becomes disengaged from the automobile. No marks are left on the automobile and there is no difficult or cumbersome mechanical attachment or disengagement of the sign.

The instant sign may, also, be used as a source of illumination. In the event that an automobile should become disabled with a flat tire in the open country, the sign may be placed on the ground with the translucent plate 38 adjacent to the portion of the automobile to be illuminated. In view of the fact that the base 12 is a broad base, there is a high degree of stability of the sign so that it does not fall over and the illumination does not change due to rolling or shifting.

A further use of the instant device is to remove the screws 56 so that the trouble light may be used by itself.

With the removal of the screws 56, the plate 48 may be removed from the base, and the socket 52 with light 54 extracted from the interior of the sign through the aperture 28. The hook 50 provides a convenient means for attaching the light to an automobile hood, such as that shown in FIGURE 9, or some other portion of the automobile. Naturally, the plug 60 is inserted in an electric cigar lighter receptacle as for other uses of the sign. When the use of the sign is completed, a trouble light may be again attached to the base.

Although a specific construction of the herein device has been explained in detail above, it is understood that those skilled in the art may make various modifications and changes without departing from the spirit and scope of the present invention. It is to be expressly understood that the instant invention is limited only by the appended claims.

What is claimed is:

1. A device of the character described comprising, in combination, an electric light, a light mount supporting said electric light, an electric cord being electrically connected at one end to said electric light, an electric plug connected to the other end of the electric cord and being adapted for mounting in an automobile electric cigar lighter receptacle to energize said electric light, a base being removably attached to said light mount for supporting said light mount and the electric light, said base having an aperture for receiving said light and an elongated slot opening into said aperture, a magnet having a narrow neck being mounted in said slot and having one portion on one side of said base and the remainder on the other side of said base, a translucent message plate fixed to said base, and a second translucent message plate fixed to said base and being substantially opposite to the first-mentioned translucent message plate to have the electric light between said plates to illuminate the plates.

2. A device of the character described comprising, in combination, a substantially flat translucent message plate, a second substantially flat translucent message plate having one edge fixed to one edge of the first-mentioned translucent message plate, a base being fixed to opposite edges of the translucent message plates and having an elongated slot contained therein with an enlarged aperture approximate the center of the slot, a pair of magnets mounted in opposite edges of the slot, each of said magnets having a reduced portion for receiving the base, an electric light positioned between said message plates for illuminating said plates, an electric light socket supporting said electric light and being positionable in the enlarged aperture in said base, a light mount supporting said electric light socket and being removably attached to said base, an electric cord being connected at one end to said electric light socket, and an electric plug connected to the other end of the cord and being adapted for mounting in an automobile electric cigar lighter receptacle to energize said electric light.

3. A device of the character described comprising, in combination, a substantially flat translucent message plate having a permanent message, a substantially flat base fixed to one edge of the translucent message plate, a second substantially flat translucent message plate having one edge fixed to the base and an opposite edge fixed to the first-mentioned translucent message plate, said second message plate having an outside surface for having a temporary message inscribed thereon, a magnet fixed to said base for removably attaching said base to an automobile, a pair of triangular end walls having vents therein fixed to the base and the message plates, a light mount removably attached to said base, a hook attached to said light mount, a light socket attached to said light mount, an electric light mounted in said electric socket and being positionable between said translucent message plates for illuminating the plates, an electric cord being electrically connected at one end to said electric light, and an electric plug connected to the other end of the electric cord and being adapted for mounting in an automobile electric cigar lighter receptacle to energize said electric light, whereby said device may be mounted on an automobile with the electric light energized to provide a trouble sign, or alternatively, the light mount may be removed from the base and the light energized to provide a trouble light.

References Cited by the Examiner

UNITED STATES PATENTS

| 1,571,749 | 2/1926 | Wohltman | 340—119 |
| 1,650,471 | 11/1927 | Servais | 340—107 |
| 2,891,235 | 6/1959 | Halpert | 340—81 |
| 2,987,702 | 6/1961 | Yohe | 340—81 |

NEIL C. READ, *Primary Examiner.*

T. A. ROBINSON, *Assistant Examiner.*